H. P. CHILDRESS.
BALE TIE BUCKLE.
APPLICATION FILED DEC. 11, 1913.
1,121,800.
Patented Dec. 22, 1914.
2 SHEETS—SHEET 1.
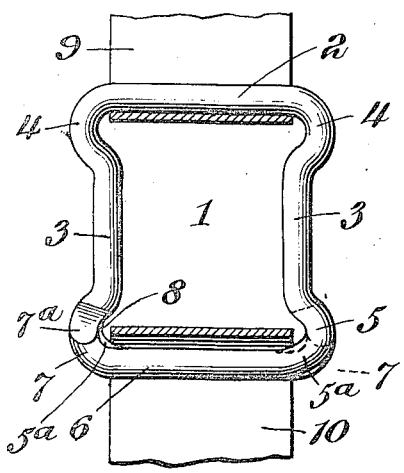
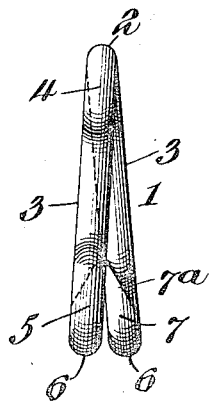
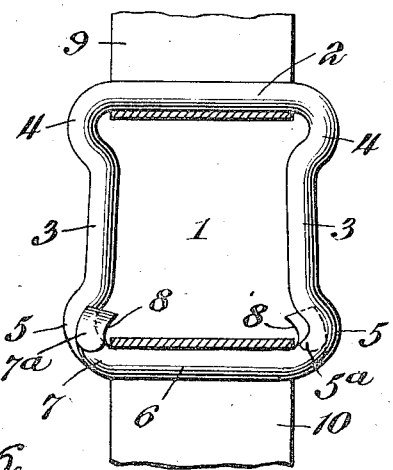
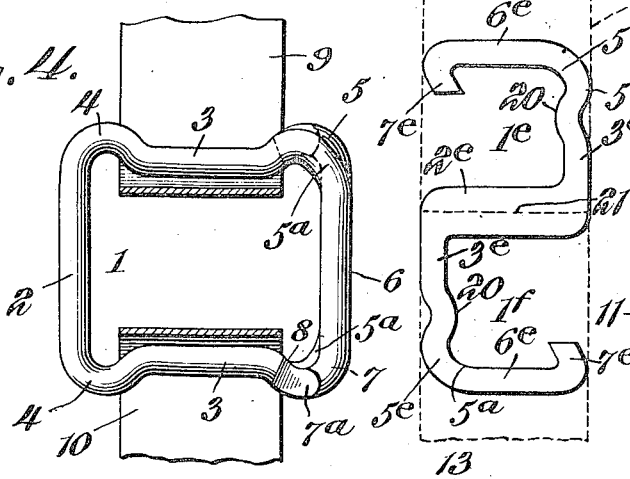
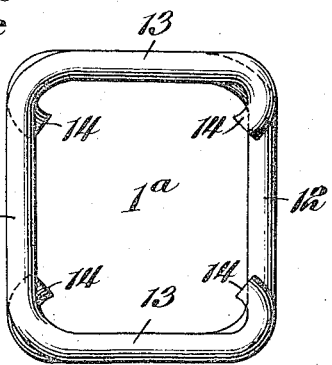
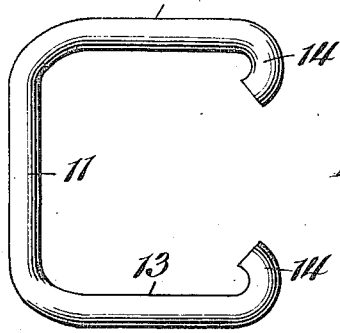
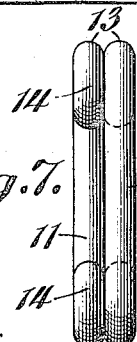
Henderson P. Childress, INVENTOR,
WITNESSES
Howard D. Orr.
F. T. Chapman.
BY
E. G. Siggers.
ATTORNEY

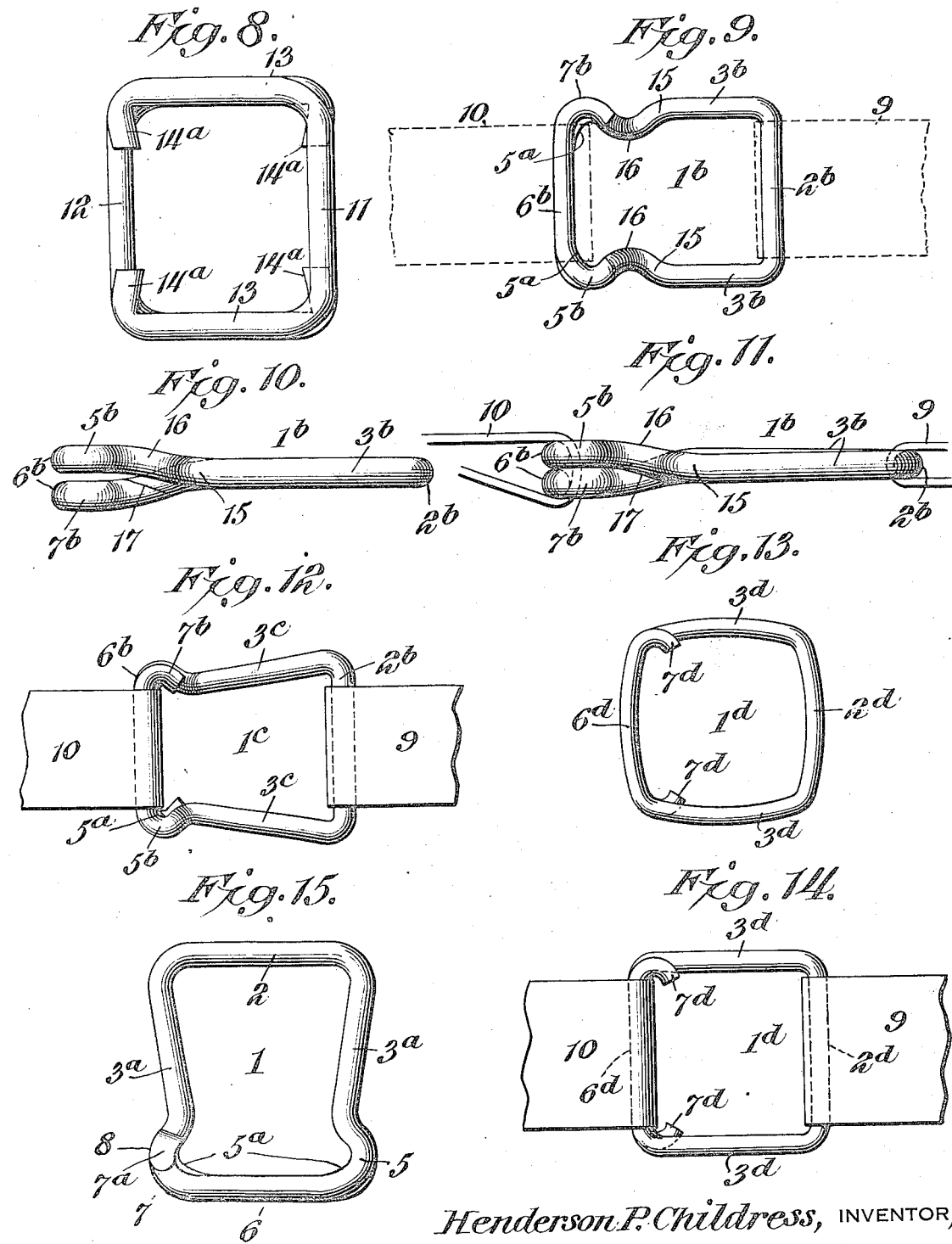

UNITED STATES PATENT OFFICE.

HENDERSON P. CHILDRESS, OF MEMPHIS, TENNESSEE.

BALE-TIE BUCKLE.

1,121,800.  Specification of Letters Patent.  Patented Dec. 22, 1914.

Application filed December 11, 1913. Serial No. 805,992.

*To all whom it may concern:*

Be it known that I, HENDERSON P. CHILDRESS, a citizen of the United States, residing at Memphis, in the county of Shelby and State of Tennessee, have invented a new and useful Bale-Tie Buckle, of which the following is a specification.

This invention has reference to improvements in bale tie buckles, and its object is to provide a buckle to which the band may be expeditiously applied, while liability of improper union of the bale band and buckle and material loss of compression of the bale are avoided.

It is the custom in the cotton baling industry to employ bale bands of strap iron or steel and the ends of these bands are returned upon themselves to form loops encircling the opposite ends of uniting buckles. One type of buckle is made of wire bent into a substantially closed loop of which one end is so constructed that the looped ends of the bale band may be there introduced into the buckle and the expansive force of the tightly compressed cotton bale serves to hold the buckle in a position preventing the escape of the band. As heretofore constructed such buckles have been open to the objection that they either pull open under the great expansive force of a tightly compressed cotton bale or they are so related to the bands as to tend to tear the latter where engaging them.

In accordance with the present invention there is provided a buckle bent into loop form preferably approaching a square in general outline, and the terminal portions each extend from a respective side toward the distant side of the loop and there terminate in a return part constituting a hook bent over toward the other side of the loop. The buckle is preferably formed of one piece of wire but may also be formed of more than one piece and, furthermore, the hook ends are so related to the sides of the buckle that while a band may be readily introduced into the buckle when of the one piece type, the introduced band is directed in its final lodgment or setting in a manner that prevents it from so lodging against a hook end as to become thereby imperfectly applied. This may be accomplished in different ways, as will hereinafter appear. With such construction the looped end of the bale band may be introduced between the adjacent extremities of the loop of the buckle where they lie side by side and are slightly spaced to facilitate the introduction of the bale band and the movement is continued until the looped end of the bale band is in embracing relation to one of the sides of the buckle, the latter being partially rotated for the purpose, and by returning the buckle to its final position the looped end of the bale band is directed into embracing relation to both of the oppositely directed extremities of the buckle and intermediate of the hooked ends. Now, upon the release of the compressed bale it tends to expand and the expansive force so exerted tends to elongate the buckle which causes an approach of the hooked ends until they engage over the corresponding side edges of the terminal loop of the bale band with the free ends of the hooks in overriding relation to the band. With such a structure no force directed lengthwise of the bale band and which is insufficient to rupture either the band or the buckle is sufficient to so straighten out any portion of the buckle that the buckle is pulled open, for the overhanging inwardly bent or return hook ends embrace the sides of the band and lock thereto most effectively. This is true whether the buckle be made of one piece of wire or two pieces. Furthermore, the buckle of the present invention permits the ends of the band where bent around the respective ends of the buckle to be tucked in or lie directly against the bale with the main portion of the band covering the tucked in ends, thus avoiding injury to other bales or articles, or to the handlers of the bales from exposed ends, and, also, preventing the pulling out of the band from the buckle. This is in compliance with the demands of the cotton baling industry.

The invention will be best understood from a consideration of the following detailed description, taken in connection with the accompanying drawing forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of a one-piece bale tie buckle in position ready for the release of the bale from compression. Fig. 2 is an edge view of the buckle of Fig. 1 with the bale band omitted. Fig. 3 is a view similar to Fig. 1 but showing the position assumed by the buckle when the band is under the expansive force of a compressed bale. Fig. 4 is a view similar to Fig. 1 but showing the buckle in the partially rotated position assumed during the application of the band. Fig. 5 is a plan view of a two piece buckle. Fig. 6 is a plan view of one element of the two-piece buckle. Fig. 7 is an edge view of the buckle of Fig. 5. Fig. 8 is a view similar to Fig 5 but showing a slightly modified form of two-piece buckle. Fig. 9 is a plan view of a one-piece buckle differing in some respects from the buckle of Fig. 1. Fig. 10 is an edge view of the buckle of Fig. 9 drawn on a larger scale and with the bale band omitted. Fig. 11 is a view similar to Fig. 10 but showing the bale band applied. Fig. 12 is a view of a buckle similar to Fig. 9 but differing therefrom in some respects. Fig. 13 is a plan view of a still further modification of a one-piece buckle. Fig. 14 is a plan view of the buckle of Fig. 13 with the bale band applied. Fig. 15 is a plan of a buckle similar to that of Fig. 1 but somewhat modified. Fig. 16 is a displayed view of still another form of hook.

Referring to the drawings and more particularly to Fig. 1 and associated figures, there is shown a buckle 1 which may be made of a single piece of wire or other suitable material, but throughout the specification and claims the term wire will be used, not only to designate an elongated metallic strand with which the term is customarily associated, but any elongated strip suitable for the purposes of the present invention.

In Fig. 1 the wire loop constituting the buckle is so bent as to form an intermediate yoke portion 2, constituting an end bar and side portions or bars 3 connected to the end bar 2 by short out bends 4, so that the side bars 3 are closer together than the length of the end bar 2, and, moreover, the side bars 3 are substantially parallel. Each side bar or portion 3 terminates at the end remote from the bend 4 in another out bend 5 similar to the bend 4 and from each bend 5 there is a bar or extension 6 which may be nearly or quite parallel with the yoke 2 and of such length as to reach to the other side of the buckle where the extension terminates in a hook 7 conforming generally to the bend 5 remote from that from which the extension 6 proceeds. The two bars or extensions 6 overlap and together constitute the other end of the buckle from that formed by the end bar 2. Each hook 7 is a return hook, that is, it is so bent or shaped that its inner wall or edge 8 is returned toward the bend 5 at the other side of the buckle. Each hook is not only bent toward the other hook on the opposite side of the loop, but is also bent toward the central portion or center of the loop. In the form shown in Fig. 1 and associated figures the hook 7 is beveled on the outer face as indicated at 7ᵃ so as to substantially merge into the bend 5 against which the hook may bear or be brought into close relation, that is, the beveled end merges into the corresponding side bar of the loop when said beveled end coincides with the adjacent portion of the side bar. The side bars 3 between the end bends make the interior of the buckle of less width or more contracted than the space between the inner edges or concaves of the bends 5, while the hooks 7 in the normal position of the parts before the application of the bale band substantially coincides with the bends 5. The junction of the side bars 3 with the bends 5 therefore form shoulders or guards for the hooks preventing a bale band from engaging either of the hooks and directing it toward its seat in embracing relation to both bars or extensions 6, as will hereinafter appear.

It is not necessary that the side bars or members 3 should be in parallelism or that the bends 4 should be present for the sides of the buckle may converge from the bars or yoke 2 toward the bends 5, as shown in Fig. 15, which agrees with the structure of Fig. 1 except that the buckle has converging side bars or portion 3ᵃ and the bends 4 are omitted, for otherwise the buckle of Fig. 15 is in agreement with the buckle of Fig. 1, and the same reference numerals are applied throughout Fig. 15 to those parts in agreement with the structure of Fig. 1.

While the bale band is customarily formed of a length of strap iron or steel of suitable length, width and thickness with the ends returned upon themselves to form loops, only the terminal portions of such a bale band are shown in the drawings, and for convenience these terminal portions are designated by the reference numerals 9 and 10, respectively. To facilitate the manipulation the end 9, which is assumed to be in the form of a loop, is first applied to the buckle so as to embrace the end bar or yoke 2 and then when the bale is under extreme compression the looped end 10 of the bale band is applied to the buckle. This is accomplished by introducing the loop 10 into the space between one extension 6 and the other, and partially rotating the buckle until the adjacent end loops of the band are in embracing relation to the sides 3, as shown in Fig. 4, whereupon the buckle is then reversely rotated until the band loops 9 and 10 are brought into encircling relation to the end bar or yoke 2 and the lapped extensions or bars 6, this last movement being rendered certain by the directing action of the shoulders formed by the meeting parts of the sides 3 and bends 5, for on the final movement of the buckle the shoulders prevent any catching of the band upon the extremity of either hook 7. Now when the bale is released from compression it immediately expands with great force and this expansive force is exerted through the band upon the buckle, whereupon there is a tendency to pull open the ends of the buckle represented by the bars or extensions 6, and this would occur were it not for the presence of the bent over hook ends 7, the bends being one toward the other, so that the two hooks are in facing relation at their extremities and also the inner walls 5ª of the bends 5 each having such a curvature or bend as to force the hooks toward the side edges of the bale band. The great force of expansion exerted lengthwise of the buckle therefore causes a spreading of the sides 3 and the approach of the hooks 7 one toward the other until their extremities are in overriding relation to and in engagement with the side edges of the end 10 of the bale band. The hooks represent short bends and are resistant to any force that can be exerted by the bale band upon the inner edges of the hooks to open them. Even an elongation of the buckle only tends to move these hooks into closer and firmer relation with the surface of the bale band which the hooks overhang, and, therefore, the hooks firmly lock with the bale band against any force exerted by the bale and against any force even such as would cause a rupturing of the buckle.

The inwardly bent or hooked ends 7 are of prime importance, since the expansive action of the expanding bale through the bale band is to bend each bar or extension 6 about its point of connection with the side bar 3 or the latter about its point of connection with the end bar or yoke 2, so that the extension 6 will recede from the bar 2 and were it not for the presence of the inturned or overhanging hook 7 this bending would ultimately carry the free end away from the yoke 2 to such an extent that it would slip under the bend of the bale band and the buckle would open until the bale band entirely escaped therefrom. This could only be avoided were the return hooks not provided, by making the buckle of wire of inordinately heavy gage not tolerated by the trade, while with the provision of the return-bent hooks a relatively light gage wire is feasible without any sacrifice of advantage and at a correspondingly reduced cost.

It is not absolutely essential that the buckle be made of one piece of wire, for it may be made of two pieces of wire, as shown in Figs. 5 to 8, inclusive, the showing of these figures being more or less indicative of various other forms of like characteristics. In Figs. 5 and 7 there is shown a buckle 1ª made up of two members 11, 12, respectively, each member including approximately three-quarters of a complete rectangle which may be substantially square, although not of necessity limited to such form. There are two end members or bars 13 joined by an intermediate member or bar and making up the three sides of the rectangle, while the extremities of the end members 13 remote from the connecting member are formed into return hooks 14 which may be similar to the return hooks 7, although in the particular showing of the drawings the beveled portions are not indicated. The members 11 and 12 may be substantial duplicates and are so placed that the hook ends 14 of one lie against the opposite end or yoke member of the other at the connection therewith of the end members 13. Now, when a bale band is applied to the buckle 1ª in a manner to have the loop ends embrace the overlapping members 13 there is a tendency to draw these members 13 away one from the other, so that they spread at the open side between the hooks 14. The spreading, however, is resisted by the engagement of the overhanging or return hooks 14 with the corresponding faces of the bale band where looped about the adjacent members 13 and the edge portions of the bale band are brought into engagement with the end members 13 close to their junction with the connecting member, wherefore the bale buckle 1ª effectively resists any tendency to straighten it out. The structure of Fig. 8 differs from that of Fig. 5 in that there are hook-shaped extremities 14ª which instead of being curved, as in Figs. 5, 6 and 7, are angular but still bend one toward the other or return toward the closed side of the particular member carrying them so as to be in overhanging relation to the bale band when in position. It will be understood, of course, that features of the buckle of Fig. 1 not included in the buckles of Figs. 5 and 8 may be incorporated therein or omitted, as desired.

The structures of Figs. 9 to 14 inclusive are shown in my application No. 775,114, filed June 21, 1913, and embody the essential features of the structures of Figs. 1 to 8 and Fig. 15 hereinbefore described. In so far as the structures of Figs. 9 to 14 are concerned, the present application is a continuation of the aforesaid application.

In Figs. 9, 10 and 11 there is shown a buckle 1ᵇ having an end bar or yoke member 2ᵇ with side bars or members 3ᵇ in approximately parallel relation except that they are bent to opposite sides of the plane of the buckle. Each side member is formed near the end remote from the end bar or yoke 2 with a bend 15 the reverse of that of the other side member, so that these two side members cross the plane of the buckle and adjacent the point of crossing and somewhat more distant therefrom than the bend 15 is from the yoke $2^b$, each side member has an inwardly directed bend 16, that is, one bend 16 has its convex side toward the other bend 16 on the opposite side of the buckle. Each bend 16 merges into a bend $5^b$ and from each bend $5^b$ there is an extension $6^b$ to the other side of the buckle, the two extensions lying side by side or overlapping and proceeding from the respective bends $5^b$ in opposite directions. Each extension or bar $6^b$ terminates in a return bend or return hook $7^b$ lying close to the bend $5^b$ of the side of the buckle adjacent to the hook $7^b$ and the inner edge of the hook, that is, the edge toward the adjacent curve $5^b$ is beveled as indicated at 17 in general conformity to the adjacent part of the buckle as formed by the bend 15 where it merges into the bend 16, the two bends being generally in planes substantially perpendicular one to the other. The bends 16 act as shoulders similar to the junction of the bends 5 with the sides 3 in the structure of Fig. 1 and serve to guide the end 10 of the bale band indicated in dotted lines in Fig. 9 and in full lines in Fig. 11 into such relation to the hook ends $7^b$ as to avoid any end engagement therewith and, therefore, causing the proper seating of the bale band with respect to the said ends of the buckle. Ordinarily in the structure of Figs. 9 to 11 the lapped or extension hooked ends or bars $6^b$ of the buckle are slightly separated leaving between them a space permitting ready insertion of the bale band, but when an extensive force is applied to the bale band these lapped ends are brought into firm side engagement and the hooks $7^b$ act as already described with reference to the hooks 7 of Fig. 1.

In Fig. 9 the sides $3^b$ are shown as generally parallel, but these sides may generally converge from the bar $2^b$ toward the lapped bars $6^b$ shown at $3^c$ in Fig. 12 where a buckle $1^c$ differing only with respect to the sides $3^c$ from the buckle of Fig. 9 is shown, and the same reference numerals applied to Fig. 9 are applied to Fig. 12 for the same parts.

The showing of Figs. 13 and 14 is that of a buckle of simpler construction than the buckles of the other figures, but illustrating the great advantages of the hooked extremities of the overlapped ends of the buckle. In Figs. 13 and 14 there is shown a buckle $1^d$ which may be made of much lighter stock than has heretofore been feasible, and this light buckle becomes possible because of the presence of the return hook ends $7^d$ which by engaging over the bale band terminal loops in embracing and overlying relation to the edges of the loop about the lapped ends anchors the buckle against spreading in the direction of strain to any material extent. The buckle $1^d$ is shown as approximately square with a slightly curved yoke or end bar $2^d$ and slightly curved side bars or members $3^d$ and slightly curved lapped extensions or bars $6^d$. When the buckle is subjected to the expansive strain of the compressed bale the slightly rounded contour of the buckle is brought into more or less correspondence to a square outline, and even though the gage of wire used in the buckle be such as would readily yield to the forces to which the buckle is subjected by the expanding bale were it not for the presence of the return hooks $7^d$, the latter effectively prevent any such pulling out of the buckle and release of the band. Experience has demonstrated that a buckle such as shown in Figs. 13 and 14 will rupture before the inturned hooked ends $7^d$ will straighten out.

In the various forms of buckle the general outline of the buckle approaches a square, that is, the loop into which the wire is bent to form the buckle approaches sufficiently near to the square outline to be termed substantially square, thereby permitting the buckle to be turned about a center point to facilitate the introduction and positioning of the bale band with no material amount of enlargement of the effective length of the bale band and buckle when the bale is relieved from the holding pressure of the compress. The slight increase in length of the buckle due to a slight bending of the overlapping ends in order to cause the hooks to approach into side engaging and overlying relation to the band is negligible.

In Fig. 16 there is shown in display form a buckle structure which may be stamped or otherwise produced from sheet or band metal, indicated in dotted lines at 19. The stamping includes two counterparts $1^e$ and $1^f$ connected by a common yoke portion or bar $2^e$ of about double the width of the other parts, the latter comprising side members or bars $3^e$ with in-bends 20 merging into out-bends $5^e$ continuing into extensions or bars $6^e$ substantially perpendicular to the sides $3^e$ and said extensions or bars terminate in return hooks $7^e$. When such a stamped out blank is bent on the dotted line 21, the two counterparts $1^e$ and $1^f$ lie face to face, forming a loop shaped buckle having the advantages of the buckles hereinbefore described, but made of sheet metal instead of a round or similarly shaped strand to which the name wire is commonly given. The term wire is intended to apply to the buckle formed as indicated in Fig. 16, as well as to the other forms shown.

What is claimed is:—

1. A bale band buckle of loop form with lapped extensions of corresponding ends of the sides, each extension terminating adjacent to the distant side of the buckle in a part returned toward the other end of the buckle and also toward that side from which the extension proceeds, said returned part constituting a hook.

2. A bale band buckle of loop form with lapped extensions of corresponding ends of the sides, each extension terminating at the end remote from the side from which it proceeds in a part returned both toward the other end of the hook and toward the side of the buckle from which the extension proceeds, to thereby form a hook, the sides of the buckle being bent in opposite directions, whereby each bent portion accommodates the hooked end of the extension of the other side.

3. A bale band buckle of loop form with lapped extensions of the sides, each extension terminating adjacent to the distant side of the buckle in a part returned toward that side of the buckle from which the extension proceeds and also toward the other end of the loop, to form a hook, and each hooked end having its tip portion beveled on one face.

4. A one piece bale band buckle formed of an end bar, two side bars, and two reversely disposed lapped bars constituting the other end of the buckle, said lapped bars terminating in hooks extending inwardly toward each other and toward the center of the buckle so as to engage around the edges of an applied bale band.

5. A one-piece bale band buckle of rectangular form consisting of a closed end and closed sides, with the remaining end of the buckle formed of two overlapping parts having hooks bent inwardly at an acute angle toward the center portion of the buckle.

6. A one-piece bale band buckle of rectangular form consisting of a closed end and closed sides, with the remaining end of the buckle formed of two overlapping parts having hooks bent inwardly toward the center portion of the buckle, the extremities of the hooks being beveled on the faces remote from the respective sides of the buckle toward said sides.

7. A one-piece bale band buckle of loop form comprising a closed end and closed sides, with the other end of the buckle formed of two overlapping parts, each part of a length corresponding to the width of the buckle and terminating at the ends in hooks bent inwardly toward the center part of the buckle.

8. A one-piece bale band buckle of loop form comprising an end bar and side bars and having the other end formed of two oppositely directed lapped bars, each having its terminal part returned toward the side of the buckle from which the respective one of the lapped bars proceeds and also toward the center part of the buckle, to form a hook, and each side of the buckle being bent into a shoulder conforming in shape to the adjacent hook.

9. A one-piece bale band buckle of loop form comprising an end bar, side bars each outwardly bent at the end remote from the end bar, and other bars extending from the outwardly bent ends of the side bars toward the respective other sides of the buckle and there terminating in a hook returned toward the center portion of the buckle and substantially conforming to the outturned portions of the side bars.

10. A bale band buckle formed of a piece of wire bent intermediately to form an end bar, from thence into side bars, and the ends of the side bars remote from the end bar being bent into short outturned bends, and from thence into overlapping bars each extending toward the other side of the buckle and together forming the other end of the buckle, with the two last-named bars each terminating in a hook formed by bending its extremity both toward the other hook and toward the central portion of the buckle.

11. A bale band buckle of a loop form comprising an end bar, side bars, and an end portion remote from the first-named end bar and composed of overlapping bars terminating in return hooks bent toward each other and toward the central portion of the buckle, the hook ends of the bars being movable toward each other under the expansive force of a bale to bring the hooks into engagement with the edges of an applied bale band and into overriding relation to the loop of the bale band where it embraces the overlapping end bars of the buckle.

12. A one piece bale band buckle of loop form having a lapped entering end, with the lapped portions terminating in hooks returned toward each other and toward the interior of the buckle, and yieldable under the action of the expansive force of a bale exerted on the looped end of a bale band encircling the lapped parts of the entering end, to move the hooks into engagement with opposite sides of the applied band in overriding relation to that face of the band directed toward the inside of the buckle.

13. A bale band buckle having a lapped entering end, with the lapped parts each terminating in a hook returned toward the other hook and toward the closed end of the buckle, and yieldable under the expansive force of a bale exerted on a bale band looped about said lapped entering end, to move the hooks into engagement with the side edges of the applied bale band and into overriding relation to that face of the applied band directed toward the other end of the buckle.

14. A bale band buckle having a lapped entering end, with the lapped parts each terminating in a hook returned toward the other hook and toward the closed end of the buckle, and yieldable under the expansive force of a bale exerted on a bale band looped about said lapped entering end to move the hooks into engagement with the side edges of the applied bale band and into overriding relation to that face of the applied band directed toward the other end of the buckle, said buckle having its side portions adjacent to the entering end formed with out-bends conforming in shape to the hooks.

15. A bale band buckle having a lapped entering end, with the lapped parts each terminating in a hook returned toward the other hook and toward the closed end of the buckle, and yieldable under the expansive force of a bale exerted on a bale band looped about said lapped entering end to move the hooks into engagement with the side edges of the applied bale band and into overriding relation to that face of the applied band directed toward the other end of the buckle, said buckle having its side portions adjacent to the entering end formed with out-bends conforming in shape to the hooks, and each hook having its extremity beveled toward the adjacent side of the buckle.

16. A bale band buckle of loop form with its initial length and width substantially equal, said buckle having a lapped entering end, with the free extremities of the lapped portions returned toward the central portion of the buckle to form hooks, said lapped extremities being yieldable to forces exerted upon a bale band applied thereto to cause the hooks to engage opposite sides of the bale band and override that face of the bale band directed toward the other end of the buckle.

In testimony, that I claim the foregoing as my own, I have hereto affixed my signature in the presence of two witnesses.

HENDERSON P. CHILDRESS.

Witnesses:
 E. E. WHITE,
 S. H. JETER.